United States Patent [19]

Sugihara

[11] 4,233,627
[45] Nov. 11, 1980

[54] SIGNAL MULTIPLEXING SYSTEM

[75] Inventor: Yasumasa Sugihara, Kawasaki, Japan

[73] Assignee: The General Corporation, Kanagawa, Japan

[21] Appl. No.: 931,916

[22] Filed: Aug. 8, 1978

[30] Foreign Application Priority Data

Aug. 9, 1977 [JP] Japan .................................. 52/95224

[51] Int. Cl.² ............................................. H04N 7/04
[52] U.S. Cl. .................................... 358/143; 358/145;
179/2 TV; 455/28
[58] Field of Search ....................... 358/143, 145, 147;
325/36, 38 B, 38 R; 179/2 TV, 15 FS, 15 BS

[56] References Cited
U.S. PATENT DOCUMENTS

| | | | |
|---|---|---|---|
| 3,898,376 | 8/1975 | Nabeyama et al. | 358/143 |
| 3,914,536 | 10/1975 | Mohri et al. | 358/143 |
| 3,992,589 | 11/1976 | Kuegler | 179/2 TV |
| 4,044,306 | 8/1977 | Villgre et al. | 325/38 B |

Primary Examiner—Richard Murray
Attorney, Agent, or Firm—Robert E. Burns; Emmanuel J. Lobato; Bruce L. Adams

[57] ABSTRACT

A system for multiplexing an FM composite television video signal and a PCM (pulse code modulation) time division multiplexed audio signal. The PCM multiplexed audio signal has a frame repetition frequency or sampling frequency $f_s$ which is related to the horizontal sync frequency $f_h$ of the composite video signal as follows:

$$f_s = f_h \times n/m$$

where m represents a selected integer representing a divisor of the number of scanning lines per frame of the television video signal and n represents a selected positive integer. The initial frame of the PCM multiplexed audio signal starts with a timing which coincides with the leading edge of the initial vertical sync pulse of a selected one of odd- and even-numbered fields of the composite video signal. This permits a decoder to achieve a synchronization of each n-th frame for every mH period (H being a horizontal scan period) by means of the horizontal sync signal and the vertical sync signal of an odd- or even-numbered field of the composite video signal even if the PCM multiplexed audio signal does not contain a framing or frame synchronizing signal.

6 Claims, 3 Drawing Figures

SIGNAL MULTIPLEXING SYSTEM

FIELD AND BACKGROUND OF THE INVENTION

The invention relates to a signal multiplexing system, and more particularly, to a system which multiplexes a composite television video signal and a pulse code modulated time division multiplexed audio signal. The term "composite video signal" is intended to include both a composite color video signal and a composite black-and-white video signal.

The signal multiplexing system of the invention is applicable to the recording and reproduction of signals in a variety of video tape systems and video disc systems. In known video tape system, a composite television video signal and audio signal are recorded on separate tracks, and no signal multiplexing takes place. However, if the multiplexing is possible, the recording capacity can be increased since the audio track can be dispensed with. On the other hand, a variety of video disc systems are known including the TED system which employs a particular record medium of the type disclosed in West Germany Laid-Open patent Specification No. P 20 24 539, the RCA system disclosed in U.S. Pat. No. 3,842,194 and the PHILIPS-MCA system disclosed in U.S. Pat. No. 3,855,426. In these systems, a composite television video signal and audio signal are recorded in a single track on a record medium in a multiplexed form. The composite video signal and audio signal are both frequency modulated while choosing the carrier frequencies so as to avoid an overlap between the occupied frequency bands. However, in these multiplexing systems, the recording level of the audio signal must be chosen considerably lower than that of the video signal, which disadvantageously results in a degraded signal-to-noise ratio of the reproduced voice as compared with that of a television broadcasting. The tone quality is also degraded in respects of high and low frequency responses, harmonic content and dynamic range.

In the audio art, it is known to record a plurality of voices in pulse code modulated and time division multiplexed form using a broad band recorder. This recording system is reported in a number of literatures and therefore will not be described in detail. However, briefly, multi-channel analog audio signals are sampled at different timings but with a common period, and the samples are quantized and encoded. The resulting digital signals of all the channels are fed to a parallel-to-serial conversion processor to produce a single digital train. Since the PCM multiplexed signal recording system enables a substantially complete elimination of various distortions, wows or flutters which may occur during the recording or playback process, there is achieved an increased dynamic range over the entire frequency band. In addition, a flat frequency response is achieved over the entire frequency band. However, the occupied frequency band must be increased, which will be considered in more detail below.

In the PCM multiplexed signal recording system, an assembly of bits representing the sampled values is called a "word", and an assembly of words from each channel which follow one after another is called a "frame". Additional bits or characters must be added to such word or frame in order to enable bit or frame synchronization during the transmission, recording or playback of the PCM signal and to reduce or compensate for the influence of code error or drop-out. To this end, a word contains a parity check bit while a frame includes a cyclic redundancy check (CRC) character or frame sync character which corresponds to one word. A PCM signal which is modulated according to the non-return-to-zero (NRZ) system has a frequency band $f_p$ which is given as follows:

$$f_p = \frac{f_s \times W \times F}{2}$$

where $f_s$ represents the sampling frequency, $W$ represents the number of bits in a word and $F$ denotes the number of words per frame. The need to contain additional bits and characters for the reasons mentioned above means that the resulting occupied frequency band must be increased in a corresponding manner.

DESCRIPTION OF THE PRIOR ART

An approach to multiplex a television video signal and PCM multiplexed audio signals is given in an article entitled "PCM-Multiplexed Audio in a large Audio-Video Routing Switcher" by R. G. Butler in "SMPTE Journal", Vol. 85, No. 11, pages 875 to 877, November 1976. It is stated that "Four analog-to-digital (A/D) converters sample and convert four audio input signals to four separate 12-bit PCM codes. Each code is sequentially loaded into the parallel-to-serial shift register to make the digital train which will modulate the biphase modulator. Within the shift register one sync bit, two address bits, one data bit, a parity bit, and three zero bits are added to each audio sample of 12 bits to make one 20-bit audio word." It is necessary that the audio word be synchronized as it reaches a deserializer shift register of a decoder. The synchronization process is called a framing, which takes place in the manner mentioned therein as follows:

"When a one reaches the end of the shift register (which is only 17 bits long) a clock-reset pulse is generated. The reset pulse clears the register to zeros and inhibits the 6-MHZ clock used for shifting data in the register for a period of three clock pulses or 3 bits. If the signal is properly framed, this will occur every twentieth bit when the first bit or sync one reaches the end of the register. If the data word is not framed within the 17-bit register, there will only be a 50% chance that the twentieth bit after reset will be a one. If the twentieth bit after reset is a zero, a new reset pulse will not be generated and the twenty-first bit will reach the end of the register. The twenty-first bit may or may not be a one, and if it is a zero, the twenty-second pulse will reach the end of the register. Eventually, the sync bit will be the twentieth bit after reset and framing will be established. This method of synchronization depends on the fact that only the first bit position in each audio word can continuously be a one. All bit positions other than the first must never continuously be ones: otherwise false framing may occur."

However, with this approach, each word contains a sync bit at its initial bit position, followed by two address bits, with a result that the resulting PCM signal has an increased occupied frequency band.

SUMMARY OF THE INVENTION

It is an object of the invention to provide a system for multiplexing a composite television video signal and PCM multiplexed audio signal in a manner such that the PCM multiplexed audio signal has a narrow occupied frequency band which does not overlap with that of the composite video signal.

It is a specific object of the invention to provide a system for multiplexing a television video signal and PCM multiplexed audio signal in a manner such that the synchronization of the PCM signal can be achieved by utilizing sync signals contained in the television signal even though the PCM signal does not include framing or sync signals.

In accordance with the invention, the PCM multiplexed audio signal which is to be multiplexed with the composite television video signal has a frame repetition frequency or sampling frequency $f_s$ which is related to the horizontal sync frequency $f_h$ of the composite video signal as follows:

$$f_s = f_h \times (n/m)$$

where m represents a selected positive integer which is a divisor of the number of scanning lines per frame of the television video signal and n represents a selected positive integer. The initial frame of the PCM signal starts with a given timing relative to the vertical sync signal of a selected one of odd- and even-numbered fields of the composite video signal. When multiplexing such a PCM audio signal with the composite television video signal, it is possible for the encoder to achieve the synchronization of each n-th frame for every mH period, H being the horizontal scan period, by utilizing the horizontal sync signal and the vertical sync signal of either odd- or even-numbered field of the composite video signal.

One skilled in the art will be readily able to determine specific values of m and n, depending on the occupied frequency band of the PCM multiplexed audio signal which can be used without an overlap with that of the composite video signal, given sampling frequency, the number of channels or the like. It is to be understood, however, that m will be an integer such as 1, 3, 5, 7 for a television system using 525 scanning lines while it will be an integer such as 1, 5, 25 for a television system using 625 scanning lines.

In a preferred embodiment of the invention, the start of the initial frame of the PCM multiplexed audio signal coincides with the leading edge of the initial vertical sync pulse signal of an odd- or even-numbered field of the composite video signal. Detection of the leading edge of the initial vertical sync pulse at this end is detailed in U.S. Pat. No. 3,436,469 assigned to the common assignee as the present invention.

DESCRIPTION OF PREFERRED EMBODIMENT

Figure 1:
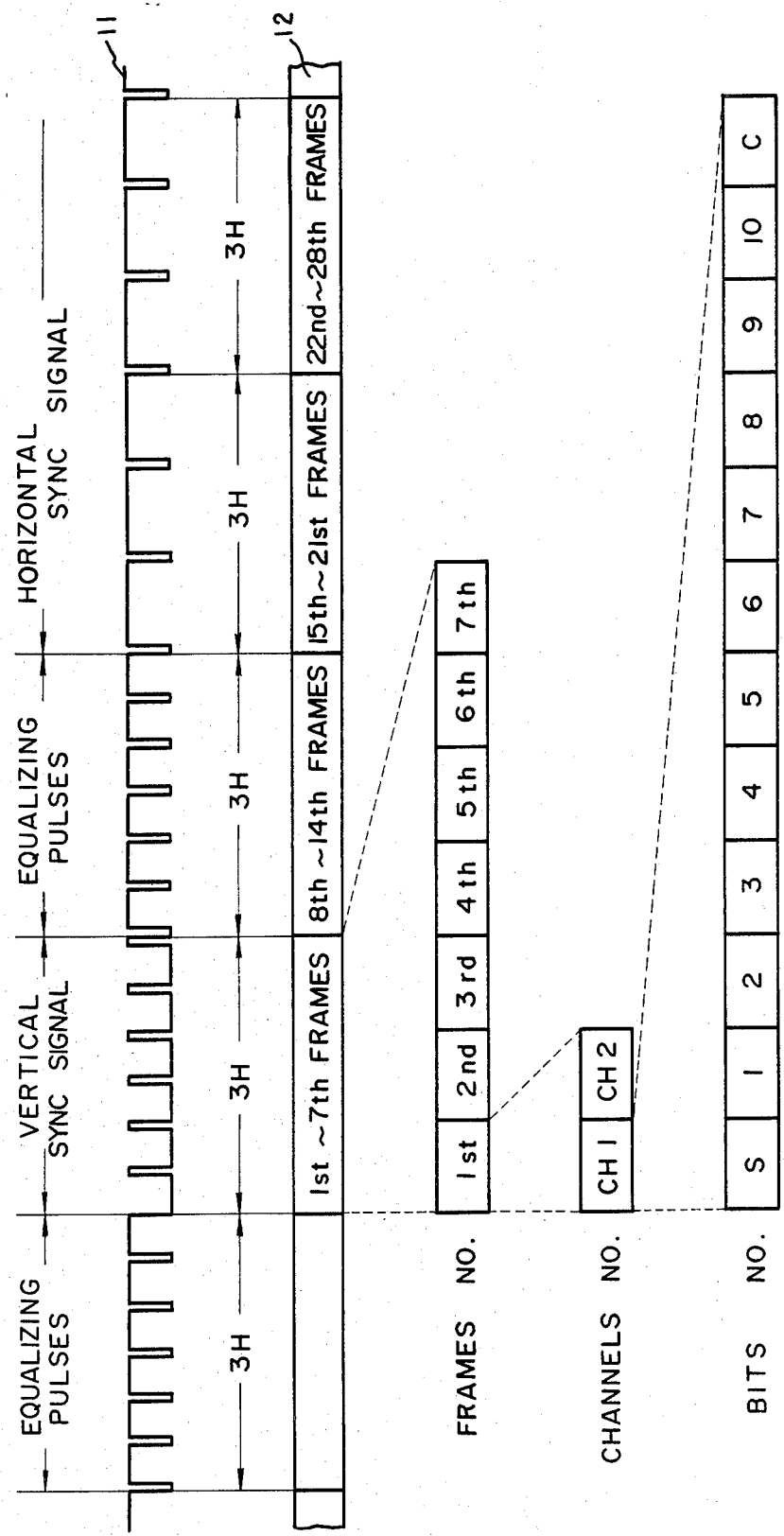
FIG. 1 is a diagrammatic illustration of a specific embodiment of the invention.

Referring to FIG. 1, there is shown a framing of a composite video signal 11 from a television system employing 525 scanning lines which is multiplexed with a 2-channel PCM multiplexed audio signal 12. A portion of the composite video signal 11 is shown which lies adjacent to the vertical sync signal of an odd-numbered field. As shown, it includes a vertical sync signal having 3H period, equalizing pulses over each 3H period preceding and following the sync signal, and a horizontal sync signal which follows the second set of equalizing pulses. In this television system, the vertical sync pulse has a frequency which is 2/525 times the frequency of the horizontal sync pulse, and the horizontal scanning or sync frequency is 15.75 kHz. The PCM multiplexed audio signal 12 includes two channels, each of which comprises ten information bits 1 to 10 with start bit s and parity check bit c which precedes and follows the information bits. For the convenience of description, additional characters are omitted from each frame, but it should be understood that other known characters such as CRC characters may be added, for example.

In the example shown, each 3H period of the composite video signal 11 corresponds to seven frame of the PCM multiplexed audio signal 12. The initial audio frame starts with the timing which coincides with the leading edge of the initial pulse contained in the vertical sync signal. Consequently, a coincidence is reached for every 3H period between the seventh frame of the PCM multiplexed audio signal 12 and the horizontal sync signal. There are $$525 \times (7/3) = 1225$$

frames during one television frame. This remains true if the frame of the PCM multiplexed audio signal is timed to the vertical sync signal of an even-numbered field. As a result, the framing of the PCM multiplexed audio signal 12 can be readily achieved by extracting from the composite video signal the horizontal sync signal and the leading edge of the initial vertical sync pulse of an odd- or even-numbered field.

The described relationship between the composite video signal 11 and PCM multiplexed audio signal 12 can be achieved by choosing a frame repetition frequency or sampling frequency $f_s$ of the PCM multiplexed audio signal which is related to the horizontal sync frequency $f_h$ of the video signal 11 as follows:

$$f_s = f_h \times (n/m)$$

where m represents a selected integer which represents a divisor of the number of scanning lines per frame of the composite video signal or the framing period of the PCM multiplexed audio signal which is counted in terms of the horizontal scan periods, and n the a selected positive integer which indicates the number of frames of PCM multiplexed audio signal which are contained in the framing period. The number of channels and the number of quantized bits are determined by the design of the system while the frequency band available to the PCM multiplexed audio signal is predetermined. Initially, a clock frequency $f_c'$ is assumed, and utilizing the total number of bits per frame F, an imaginary sampling frequency $f_s'$ is determined.

$$f_s' = f_c'/F$$

Since the ratio of the sampling frequency $f_s'$ to the horizontal sync frequency $f_h$ is equal to n/m or $$n/m = f_s'/f_h$$

the value of n can be determined by calculation when a value of m is chosen. If the resulting value of n is not an integer, an integer which is close to the calculated value is chosen. When the values of n and m are determined in this manner, the actual sampling frequency $f_s$ and clock frequency $f_c$ can be calculated.

When multiplexing the composite video signal and PCM multiplexed audio signal, the video signal is frequency modulated in known manner, and the PCM multiplexed audio signal is multiplexed with the modulated video signal with a timing such that the starting point of the initial frame of the PCM multiplexed audio signal coincides with the leading edge of the initial vertical sync pulse of an odd- or even-numbered field of the composite video signal.

In the example shown in FIG. 1, m=3, n=7. Hence the sampling frequency $f_s$ of the PCM multiplexed audio signals is $$f_s = 15.75 \times (7/3) = 36.75 \text{ kHz}$$

While the number of bits which represents a quantization of each sampled value is 10, the start bit and parity check bit are added thereto, so that one word includes 12 bits, and one frame includes 24 bits. The clock frequency $f_c$ of the PCM multiplexed audio signal is $$f_c = 36.75 \times 24 = 882 \text{ kHz}$$

When the signal is subjected to a modified phase modulation (MPM) which is proposed by the present inventor, the fundamental low frequency component with be 441 kHz which is one-half of 882 kHz while a transmission capability up to a high frequency component of 882 kHz is required. Consequently, the occupied frequency band of the PCM multiplexed audio signal lies in a range from 400 kHz to 1.2 MHz with a certain margin. The MPM scheme is disclosed in detail in pending U.S. patent application Ser. No. 903,695 filed May 8, 1978. It is similar to the known phase modulation scheme in that a leading edge of pulse corresponds to "1" bit. However, the situation is changed for "0" bit. Specifically, there is no change in the pulse level for a single "0" bit, but a pseudo pulse is inserted with an interval which is an odd multiple of $\frac{1}{2} T_0$ ($T_0$ being the clock period) from adjacent pulses whenever more than one "0" bits follow in succession. This modulation scheme is advantageous in permitting a bit synchronization with a simple peak detection. However, any other known modulation scheme may be employed.

The occupied frequency band of the composite video signal can be chosen between 1.2 to 4.2 MHz when it is frequency modulated 2.8 MHz at sync peak, 3.22 MHz at pedestal level and 4.2 MHz at white peak level and assuming a rapid attenuation of those components which are higher than 4.2 MHz. Under this condition, it is possible to achieve a resolution of the demodulated picture which exceeds 200 lines.

As a consequence, if a linear quantization of ten bits is employed, it is possible to achieve a dynamic range of about 60 db, a signal-to-noise ratio of 50 db and a harmonic distortion factor less than 0.1% in accordance with the invention, assuring a substantially improved audio quality as compared with a conventional video tape or video disc system.

Figure 2:
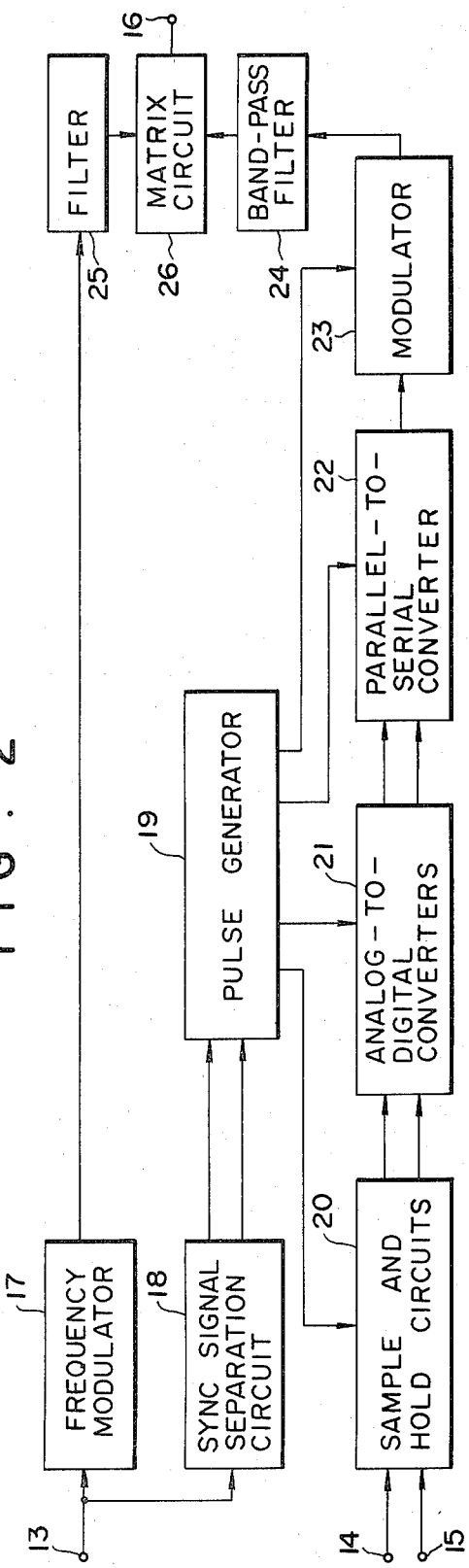
FIG. 2 is a block diagram of an encoder which is preferred for use in the reduction to practice of the invention.

Referring to FIG. 2 which shows an encoder, a composite video signal is applied to input terminal 13 and thence to frequency modulator 17 where a frequency modulation takes place with a shift to produce a concentrated principal energy in the first sideband. Thereafter, it is passed through filter 25 which eliminates higher sidebands, and feeds the modulator signal to matrix 26. This method is widely employed in the known VTR or video disc system. The composite video signal applied to input terminal 13 is also fed to sync signal separator 18, which derives the horizontal sync signal and a drive pulse corresponding to the leading edge of the initial pulse of vertical sync signal of an odd- or even-numbered field. The both pulses are applied to pulse generator 19. The generator 19 produces sampling pulses of a sampling frequency which is n/m times the frequency of the horizontal sync signal. At the same time, it utilizes the drive pulse to determine the phase relationship between the sampling pulses and the video signal in a unique manner. In addition, it produces various pulses including a clock signal, gate pulse, timing pulse or the like which are required in accordance with the format of the PCM signal depending on the number of quantized bits, the number of audio channels and the error check technique.

Audio signals applied to input terminals 14, 15 are fed to a plurality of sample and hold circuits generally indicated by reference character 20, and are sampled by means of the sampling pulses applied from the pulse generator 19. The resulting samples are applied to a plurality of A-D converters generally shown by reference numeral 21. Converters 21 are supplied with clock pulses and other necessary pulses and the individual samples are quantized and encoded from the generator 19, and then supplied to time division multiplexer or parallel-to-serial converter 22, which is also supplied with clock pulses and gate pulses to convert the parallel signals from respective channels into a serial signal. If required, an error check character may be added in time division multiplexer 22. The PCM multiplexed audio signal is then passed through bandpass filter 24 to matrix circuit 26, where it is multiplexed with the signal fed from filter 25 before it is delivered to output terminal 16 in a multiplexed form.

Figure 3:
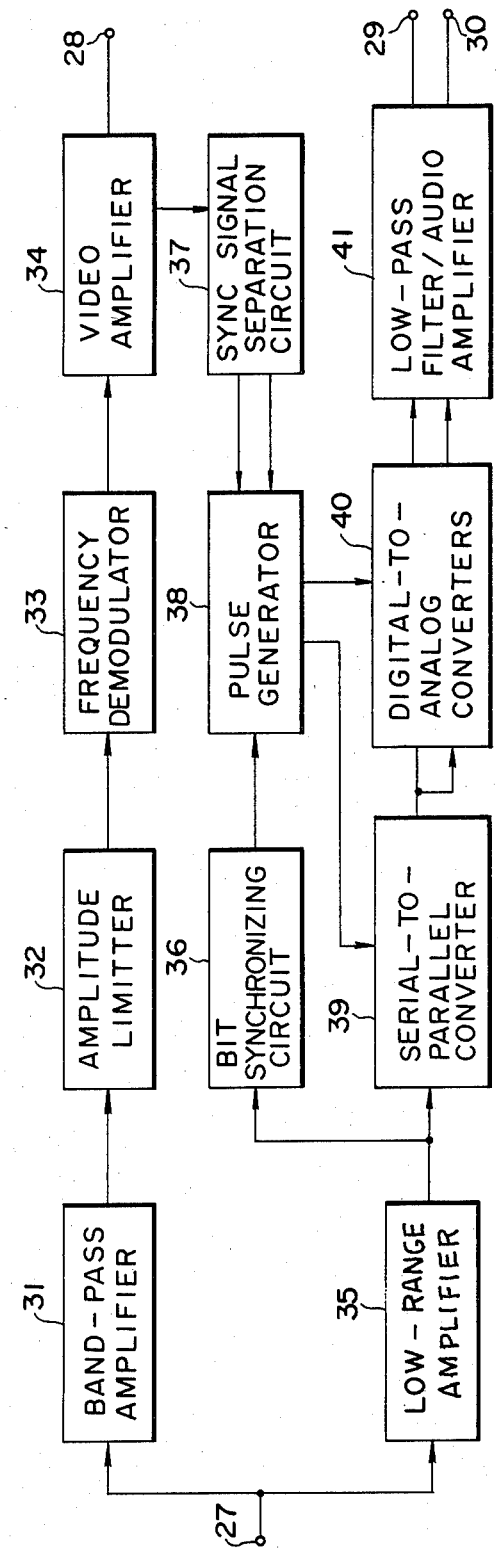
FIG. 3 is a block diagram of a decoder which is used in combination with the encoder shown in FIG. 2.

FIG. 3 shows a decoder which decodes the signal multiplexed in accordance with the invention. A multiplexed signal which is reproduced from a record medium is applied to terminal 27, and thence fed to bandpass amplifier 31 and low range amplifier 35. Higher sidebands are eliminated from the signal applied to amplifier 31, and the PCM signal in the low range is also eliminated. Subsequently, the output signal from amplifier 31 is fed to amplitude limiter 32 after the amplitude of the lower sidebands located within the band has been corrected. It is then applied to FM demodulator 33, and the demodulated composite video signal is applied to video amplifier 34 and thence fed to output terminal 28. If required, video amplifier 34 may include a de-emphasis circuit, and also may contain a low pass filter which eliminates the FM carrier. The composite video signal obtained by video amplifier 34 is also applied to sync separator 37 where the horizontal sync signal and a drive pulse corresponding to the leading edge of the initial pulse of the vertical sync signal of an odd- or even-numbered field are derived and fed to clock and timing pulse generator 38.

On the other hand, the video signal component is eliminated from the signal that is applied to the low range amplifier 35, which may comprise a bandpass amplifier. The output of amplifier 35 is applied to bit synchronization circuit 36, which produces a continuous signal of a frequency which is the same as or double the clock frequency for application to pulse generator 38. In response to the horizontal sync signal and drive pulse from the sync separator 37, the generator 38 produces a frame sync signal of a frequency and a phase which is completely the same as the phase relationship between the video signal and the frames of the PCM signal. In addition, it produces a clock signal and any other pulses such as timing pulses or gate pulses which are required in the operation of the decoder. The gate pulses which are produced by generator 38 in this manner are fed to distributor or serial-to-parallel converter 39 which then operates to separate signals belonging to individual channels from the time division multiplexed audio signal. Each channel signal is applied to an associated one of a plurality of D-A converters generally shown by reference numeral 40 in serial fashion for conversion into a corresponding analog signal. The analog audio signal of each channel is passed through a combination of low pass filter and audio signal amplifier, inclusively shown by reference numeral 41, for output to terminals 29, 30.

While the invention has been described in detail with reference to a particular preferred embodiment, it should be understood that it is exemplary only and not limitative of the invention. As mentioned, the invention is equally applicable to a television system employing 625 scanning lines in the similar manner as described above. While in the example shown, a signal corresponding to the leading edge of the initial vertical sync pulse of an odd-numbered field has been derived, it may correspond to the leading edge of the initial vertical sync pulse of an even-numbered field. Alternatively, the both fields may be used.

What is claimed is:

1. In a system for multiplexing a frequency modulated composite television video signal and a PCM multiplexed audio signal composed of pulse code modulated time division multiplexed audio signals, wherein the PCM multiplexed audio signal has a frame repetition frequency or sampling frequency $f_s$ which is related to the horizontal sync frequency $f_h$ of the composite video signal by the following expression:

$$f_x = f_h = (n/m)$$

where m represents a selected integer which represents a divisor of number of scanning lines per frame of the composite video signal and n represents a selected positive integer: means for multiplexing the PCM multiplexed audio signal with the composite video signal in a manner such that the start of the initial frame has a given timing relationship relative to the vertical sync signal of a selected one of an odd- and even-numbered field of the composite video signal.

2. A system according to claim 1 in which the start of the initial frame coincides with the leading edge of the initial vertical sync pulse of an odd-numbered field of the composite video signal.

3. A system according to claim 1 in which the start of the initial frame coincides with the leading edge of the initial vertical sync pulse of an even-numbered field of the composite video signal.

4. An encoder for multiplexing a composite television video signal with a plurality of audio signals, comprising: a video input terminal for receiving the composite video signal; a sync signal separation circuit connected with the video input terminal for extracting the horizontal sync signal and a signal which corresponds to the leading edge of the initial pulse of the vertical sync signal of a selected one of an odd- and even-numbered field from the composite video signal; a timing pulse generator for producing various pulses in response to the horizontal sync signal and the signal which corresponds to the leading edge of the initial vertical sync pulse; a plurality of audio input terminals for receiving audio signals of a plurality of channels; a plurality of sample and hold circuits connected with respective ones of the audio input terminals and receiving sampling pulses from the timing pulse generator to sample respective ones of the audio signals, the sampling pulses having a frequency $f_s$ which is related to the frequency $f_h$ of the horizontal sync signal by the following expression:

$$f_s = f_h \times (n/m)$$

where m represents a selected integer which represents a divisor of the number of scanning lins per frame of the composite video signal and n represents a positive integer; a plurality of analog-to-digital converters for receiving samples from respective ones of the sample and hold circuits and for converting them into a word formed by a plurality of bits; a multiplexer responsive to the signal supplied from the timing pulse generator and which corresponds to the leading edge of the initial vertical sync pulse for receiving words from the individual analog-to-digital converters sequentially and in parallel fashion for rearranging them into a serial form to output a pulse code modulated time division multiplexed audio signal composed of a succession of frames comprising words from respective channels by determining the relative position of the initial frame of the PCM multiplexed audio signal relative to the composite video signal; and a matrix circuit for adding the frequency modulated composite video signal with the PCM multiplexed audio signal.

5. An encoder according to claim 4, further including a modulation circuit for modulating the PCM multiplexed audio signal; said matrix circuit adding the frequency modulated composite video signal and the PCM multiplexed audio signal which is modulated by the modulation circuit.

6. A decoder for demodulating a multiplexed video-audio signal which is produced by multiplexing of a frequency modulated composite video signal and pulse code modulated time division multiplexed audio signals, comprising: an input terminal for receiving the multiplexed video-audio signal; a bandpass amplifier for separating the frequency modulated composite video signal from the multiplexed video-audio signal; an FM demodulator connected to receive and demodulate the frequency modulated composite video signal; a sync signal separation circuit for separating a horizontal sync signal and a signal which corresponds to the leading edge of the intiial pulse of a vertical sync signal of a selected one of an odd- and even-numbered field from the demodulated composite video signal; a low pass amplifier for separating the PCM multiplexed signal from the multiplexed video-audio signal; a bit synchronization circuit for producing a signal having a frequency which is the same as or double the clock frequency in response to the PCM multiplexed signal; a timing pulse generator for producing various pulses in response to the outputs from the sync signal separation circuit and the bit synchronization circuit; a converter controlled by gate pulses having a given timing and which are supplied from the timing pulse generator for separating the PCM multiplexed signal into digital outputs corresponding to individual channels; and a plurality of digital-to-analog converters for converting the digital outputs of the converter into corresponding analog audio signals.

* * * * *